: 3,598,564
PLANT GROWTH REGULATING AGENTS
Ernst Jacobi, Dietrich Erdmann, Günther Mohr, Sigmund Lust, and Gerhart Schneider, Darmstadt, and Konrad Niethammer, Traisa, Germany, assignors to E. Merck A.G., Darmstadt, Germany
No Drawing. Continuation-in-part of applications Ser. No. 326,186, Nov. 26, 1963, Ser. No. 310,118, Sept. 19, 1963, Ser. No. 736,954, June 14, 1968, now Patent No. 3,506,434, and Ser. No. 508,835, Nov. 19, 1965, now Patent No. 3,476,545. This application Apr. 17, 1969, Ser. No. 817,194
Claims priority, application Germany, Sept. 22, 1962, M 54,289; Dec. 1, 1962, M 54,974; Nov. 27, 1964, M 63,287; Mar. 13, 1965, M 64,518
Int. Cl. A01n 9/24, 3/02, 21/02
U.S. Cl. 71—76
38 Claims

ABSTRACT OF THE DISCLOSURE

For regulating plant growth, a composition comprising at least one fluorene-9-carboxylic acid ester derivative substituted by halogen in 2- and/or 7-position.

---

This application is a continuation-in-part of application Ser. No. 326,186, filed Nov. 26, 1963, 310,118 filed Sept. 19, 1963, both now abandoned, 736,954 filed June 14, 1968 now U.S. Pat. 3,506,434 and 508,835, filed Nov. 19, 1965, now U.S. Pat. 3,476,545.

This invention relates to plant growth regulating compositions.

The principal object of this invention, therefore, is to provide compositions and a method of effecting plant growth regulating activity in plants.

Upon further study of the specification and claims other objects and advantages of the present invention will become apparent.

To attain the objects of this invention, it has been discovered that fluorene-9-carboxylic acid derivatives of Formula I

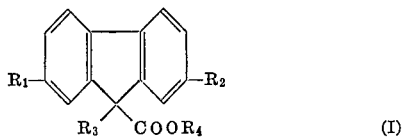

wherein $R_2$ is selected from the group consisting of hydrogen and halogen
$R_1$ is halogen (chlorine, bromine, fluorine, iodine)
$R_3$ is hydrogen, hydroxy or chlorine
$R_4$ is an alkyl group of up to 8 carbon atoms exhibit an outstanding activity on plant growth by influencing plant development in an active state of growth of the plant. This influence probably takes place by an intervention in cell division and cell determination and thus shows its effects histologically, anatomically and morphologically.

The above-mentioned fluorene derivatives are highly active plant growth-regulating agents with a quite unprecedented breadth of activity. The compounds are absorbed by the plant, transported in it and apparently selectively enriched in meristematic tissue, especially in the vegetation points. Thus, they intervene to a previously unknown extent in the developmental processes of intact plants. They are characterized by an outstanding low phytotoxicity and have a long lasting influence on tissue and organ formation and on any new growth by disturbing the histological tissue topography and texture in the meristematic growing points. Because of this influence on cell division, cell determination, cell differentiation and tissue organization, particularly the new-growth of the plant after the treatment is affected. This fundamental influence on the growing plant is responsible for the exceptional variety of symptoms which the active compounds defined above exhibit when used in plants. Generally, inhibition of growth and development takes place, sometimes producing even organ regressions, organ metamorphoses, organ deficiencies and also new formations of organs.

Characteristic for the active compounds of this invention is their preferential intervention in meristematic tissues which are in an active state of division such as tissue of the main vegetation points or of the cambium. Meristematic tissues in a resting state or tissues and organs already fully differentiated at the time of treatment are scarcely influenced.

Besides this tissue-selective interaction, the compounds of the present invention differ considerably from the known growth regulators.

First of all, in general the compounds of this invention are phytotoxic—if at all—only to a remarkably slight extent, even at high concentrations up to 10,000 p.p.m., for example with respect to perennial grasses. Consequently, their plant growth regulating activity extends over an extremely wide range of concentration within which the active compounds display their activity with different strength and duration, in dependence of the dosage applied. In contrast, the known plant growth regulators such as phenoxy compounds or maleic hydrazide because of their relatively high phytotoxicity possess only a comparatively narrow concentration range and show at least herbicidal action at higher concentrations. In addition, known growth regulators cannot be used in many cases where an exact and sufficiently low application rate is not warranted in practical use. In comparison, the new compounds show a heretofore unknown favorable therapeutic index for modifying plant growth. Another important fact is the limited life-time of the novel compounds in the plant and in the soil which generally extends over some weeks only. In consequence, no problems arise from residuals, neither in the harvested products nor in the soil. This constitutes another important advantage with respect to known compounds such as halogenated benzoic acids or picolinic acid derivatives the practical usefulness of which is often restricted because of their long lasting persistence and residual problems. The superiority of the novel compounds in view of known growth regulators is further demonstrated by the fact that plants treated according to the invention in general retain their ability to return to normal new-growth and development. The period for which an inhibition or modification is desired may be regulated to a wide extent by the dosage chosen. High dosage effects strong and lasting growth inhibition or retardation whereas low dosages yield short-acting growth inductions, such as improvement of branching, or tillering, or rooting, rapidly followed by normal new-growth. This mild and controllable growth-regulating activity is an outstanding and unforeseeable feature of the compounds of this invention.

The active substances according to the invention display their action even in extreme dilutions i.e. even at concentrations varying within a range of 0.01 to 100 p.p.m. (parts per million), depending on the compound, the type of plant, the method of application and external influences. In this respect, the compounds of Formula I are even superior to the known fluorene-9-carboxylic acid derivatives.

The mode of action is completely systemic. The active materials penetrate for example into the seeds with the swelling water, but usually display a recognizable effect only in the germinating seedling or young plant. Applied to the growing plant, the substances are readily taken up via the leaves, other organs and through the roots and are transported and distributed in the plant acropetally as well as basipetally.

Consequently, the influence of the active compounds can be observed in very different parts of the plant, for instance in leaves, stems, roots, and sprouts. For example, in leaves and petals, a reduction of the leaf laminae is observed. Furthermore, reduction of the normal number of internodes and leaves up to complete blocking of any new-growth may occur. Increased and decreased formation of flower buds has been observed as well as premature or retarded development of flower buds or other ograns, depending on the state of development at the time of application since fully developed tissue generally is not affected. Decisive is the state of development at the time of application.

A very important effect of the compounds according to this invention is the gradual diminution or even elimination of the normal apical dominance in plants which offers manyfold practical implications. Upon application of the new compounds, the main stem of plants is gradually shortened and at the same time branching of stems is favored. Plant habit can be changed to a dwarfed, but bushy type of growth. This fundamental effect occurs in all groups of multicellular plant species, including monocotyledoneous crop plants (cereals, rice, corn, sugar cane etc.) as well as turf and lawn grasses the tillering of which is of special interest. Increase in branching or tillering may be effected not only in annuals and perennials but also with woody plants and is of major interest in the wide-spread field of plant cultivation.

The new compounds also influence metabolism in plants giving rise, for instance, to increased chlorophyll formation or increase in plant constituents such as starch, sugars, and proteins.

Variations also occur in the roots. For example, an increased branching of the roots can be effected resulting in formation of more side roots of the first or second order, together with thickening of the roots, resulting in beet-like storage roots. Furthermore, enlargement and increase in number of the root hairs can be induced, as well as, in the case of cuttings, increased formation of adventitious roots.

Numerous other effects can also be achieved in plants by the action of the fluorene derivatives of this invention, e.g. parthenocarpic fruit formation (formation of seedless fruits without fructification) as well as interruption of the seed rest period of plant seeds with endogenic germination delay and induction of bud break or dormancy-depending on application time and dosage. The active compounds also can influence the water metabolism of the plants, e.g. the guttation of monocotyledon seedlings.

Although some fluorene-9-carboxylic acid derivatives have already been described to be of influence with respect to plant growth it could not be foreseen that the compounds of this invention are of such an outstanding and superior effectiveness as plant growth regulators. Thus, with respect to those compounds unsubstituted in 2- and/or 7-position, the halogenated compounds of this invention are manyfold more effective. It has furthermore been proved that the minimum concentration necessary to obtain a growth regulating effect is up to more than tenfold increased when comparing halogen substituted fluorene-9-carboxylic acid derivatives of this invention with the derivatives devoid of such a halo substituent.

Still more surprising is the fact that the esters of this invention are by far more effective as plant growth regulating agents than are the free acids although the prior art teaches for similar compounds that hydrolysis in vivo to the parent acid must be considered to be a possible complication. Thus it really is astonishing that the esters of Formula I are highly superior in activity even with respect to the 2-chloro-9-hydroxy-9-fluorene-9-carboxylic acid which is described in the prior art to possess the strongest antigeotropic effect of a number of compounds of this series (Journal of the Science of Food and Agriculture, vol. 5, page 45 (1945)).

To demonstrate this superiority, the following test has been conducted:

Young seedlings of Galium aparine were treated in the early cotyledon stage. Each cotyledon received a droplet of exactly 0.02 ml. (=0.04 ml. per plant) of a formulation of the respective active ingredient in various concentrations. 3 tests with each 6 plants were carried out for each treatment and the values obtained were averaged. The formulations were prepared by dissolving the active compounds in small amounts of acetone and suspending this solution in demineralized water with addition of small amounts of a usual emulsifier ("Tween 20").

Evaluation took place 14 days after treatment. The growth regulating activity was determined by values ranging from 0=no effect through 1=slight, 2=strong, 3=very strong effect. The following figures indicate the minimum concentrations in p.p.m. which were necessary to obtain a strong effect (corresponding to value 2).

| Active compound | Minimum conc., p.p.m. |
| --- | --- |
| 2-chloro-9-hydroxy-fluorene-9-carboxylic acid | 6.0 |
| Methyl-2-chloro-9-hydroxy-fluorene-9-carboxylate | 0.1 |
| Ethyl-2-chloro-9-hydroxy-fluorene-9-carboxylate | 0.2 |
| n-Propyl-2-chloro-9-hydroxy-fluorene-9-carboxylate | 0.2 |
| Isopropyl-2-chloro-9-hydroxy-fluorene-9-carboxylate | 0.2 |
| n-Butyl-2-chloro-9-hydroxy-fluorene-9-carboxylate | 0.75 |
| Iso-butyl-2-chloro-9-hydroxy-fluorene-9-carboxylate | 1.5 |
| n-Butyl-2-bromo-9-hydroxy-fluorene-9-carboxylate | 1.5 |
| Ethyl-2-iodo-9-hydroxy-fluorene-9-carboxylate | 1.5 |
| Methyl-2-fluoro-9-hydroxy-fluorene-9-carboxylate | 1.5 |
| Methyl-2-chloro-fluorene-9-carboxylate | 0.75 |

The fluorene carboxylic acids of Formula I are obtainable from known compounds by usual methods. Thus, the esters are available either by direct esterification of the corresponding acids by standard techniques or via the 9-chlorofluorene-9-carboxylic acid chloride which can be converted into the desired ester by known methods followed by replacing the 9-chloro substituent if desired by an hydroxy group by treatment with silver hydroxide. It is further possible to introduce the halogen atoms in 2- and/or 7-position, especially the chloro substituents, directly by halogenation. In such cases, usually a mixture of the 2-substituted and 2,7-disubstituted derivatives is formed which for usual purposes of plant treatment according to this invention need not be separated. In general, such a mixture is used for the purposes of this invention in form of a 98% technical product containing, for instance, about 65 to 70% alkyl 2-chloro-9-hydroxy-fluorene-9-carboxylate, 10–15% alkyl 2,7-dichloro-9-hydroxyfluorene-9-carboxylate, and about 15–20% of the starting material, i.e. the corresponding alkyl 9-hydroxy-fluorene-9-carboxylate. Preferably, the methyl esters are prepared.

All substituted 9-hydroxy-fluorene-9-carboxylic acids to be used as starting materials are available from the correspondingly substituted phenanthrenequinones by the well-known benzilic acid rearrangement.

Examples of individual effective compounds are the following:

methyl-2-chloro-9-hydroxy-fluorene-9-carboxylate
ethyl-2-chloro-9-hydroxy-fluorene-9-carboxylate
n-propyl-2-chloro-9-hydroxy-fluorene-9-carboxylate
i-propyl-2-chloro-9-hydroxyfluorene-9-carboxylate
n-butyl-2-chloro-9-hydroxy-fluorene-9-carboxylate
isobutyl-2-chloro-9-hydroxy-fluorene-9-carboxylate
n-heptyl-2-chloro-9-hydroxy-fluorene-9-carboxylate
iso-octyl-2-chloro-9-hydroxy-fluorene-9-carboxylate
methyl-2-bromo-9-hydroxy-fluorene-9-carboxylate
n-butyl-2-bromo-9-hydroxy-fluorene-9-carboxylate
methyl-2-iodo-9-hydroxy-fluorene-9-carboxylate
methyl-2-fluoro-9-hydroxy-fluorene-9-carboxylate methyl-2,7-dichloro-9-hydroxy-fluorene-9-carboxylate
n-propyl-2,7-dichloro-9-hydroxy-fluorene-9-carboxylate
n-butyl-2,7-dichloro-9-hydroxy-fluorene-9-carboxylate
sec.butyl-2,7-dichloro-9-hydroxy-fluorene-9-carboxylate
iso-octyl-2,7-dichloro-9-hydroxy-fluorene-9-carboxylate
methyl-2,7-dibromo-9-hydroxy-fluorene-9-carboxylate
n-butyl-2,7-dibromo-9-hydroxy-fluorene-9-carboxylate
methyl-2-chloro-fluorene-9-carboxylate
isopropyl-2-chloro-fluorene-9-carboxylate
methyl-2,7,9-trichloro-fluorene-9-carboxylate
methyl-2,9-dichloro-fluorene-9-carboxylate.

The active substances according to this invention have been tested on numerous types of plants of most varied species, for example, tomatoes, pumpkins, cucumbers, beans, radishes, carrots, celery, lettuce, potatoes, sugar beets, cereals, maize, rice, cleavers, hemp-nettle, French weed, types of knot grass, charlock, white goose-foot, chickweed, autumn dandelion, field bindweed, dandelion, types of cocks foot, plantain species, colt's foot, small nettle, camomile, field ox-eye daisy, horse-thistle, as well as cotton, soy-bean, sugar cane, vines, fruit trees, grasses and ornamentals, f.e. cacti.

Since the fluorene derivatives of this invention show such a broad spectrum of effects when applied to plants and since they can, of course, in addition be used in combination with a great variety of other substances influencing the growth of plants, the possibilities for their commercial utilization are correspondingly diverse.

Thus, the fluorene derivatives according to the invention can be used for a general regulation and preferably retardation of plant growth. As a rule, they inhibit growth and development but do not kill the treated plants which exhibit a suppressed and bushy growth pattern. Thus, they are extremely useful for control of plants in such places where no herbicidal destruction effect is wanted but rather maintenance of a controlled (retarded, dwarfed) vegetation is desired for special purposes, such as protection of the soil against erosion, or where the expense for cutting labor is to be lowered. Areas of application are, for example, ditch slopes and dams, road edges, and borders of highways, airports and military areas. Retardation of plant growth with agents according to the invention is also suitable where a certain coverage of the soil by plants is to be retained such as for shading the soil (soil conditioning), in which places, consequently, the usual herbicides cannot be used, such as in perennial cultures, for example, fruits, vine, cotton crops. Moreover, the usual herbicides generally cause browning of the treated plants. This effect often is undesirable for instance in public parks and athletic grounds. In these cases, the agents according to the invention are particularly suitable for retarding the vegetation since no comparable discoloration occurs whilst the plant growth can be nearly stopped for a relatively long period. Treatment can be conducted in such a way that after a certain time the plants return to normal growth.

Because of a certain selectivity in the sensitivity of the plants, the compounds of Formula I are also suitable for selective methods of control, such as changing the composition of species in a plant community, for example, repressing broad-leaved weeds in cultures of monocotyledonous plants, or indirect eradication of perennial weeds in meadows and pastures.

The fluorene derivatives according to the invention can also be used for the general retardation of plant development such as delaying of flowering or harvest time, or for delaying bud burst and blossoming in orchards and vineyards for protection against frost damage; further for delaying sprouting of tubers, bulbs, and beets in storage, or for preventing sprouting of, for example, lettuce or celery, or for influencing ripening or harvest times. The compounds are also suitable for an increase in flower bud formation and fruit set, for the thinning of fruit, as well as for the prevention of the premature dropping of fruit. These effects play a part particularly for fruit species, for example, for fruit with pips and stones, for bananas, lemons, and oranges.

Furthermore, with the agents according to the invention it is also possible to achieve an increase in flower formation. This effect is of advantage for example, in the cultivation of flowering and ornamental plants, or of cotton or soy bean. Seedless fruits, for example tomatoes, can also be produced with the active materials according to the invention. The durability and storability of harvested products can be improved by treatment before the harvest or also in storage. Thus, for example, the shooting of root vegetables is prevented, or a longer period of freshness of the leaves (remaining green) of harvested radishes and carrots is attained.

Finally, the agents according to the invention can also serve for increasing the stability, for example, of cereals or for the improvement of the fibre quality of fibre plants. They can also improve the rooting of cuttings and serve for the acceleration of vegetative propagation of plants by stimulation of side shoot and/or runner or stolone formation. A further field of use is the production of special ornamental plant morphoses by alteration of the branching habit or by influencing the formation of flowers and leaves.

The active substances can be worked up to all forms of preparations customary for use in plants. As additives and fillers the usual materials are employed, for example, clay, kaolin, bentonite, ground shale, talc, chalk, dolomite or kieselguhr, insofar as solid preparations are concerned. For liquid formulations, xylene, solvent naphtha, petroleum, acetone, cyclohexane, dimethyl formamide, aliphatic alcohols or even water are used as solvents. Emulsion concentrates can be marketed as such. Before use, the emulsion concentrates are diluted with water in the usual manner. Application is possible by all common methods such as spraying, pouring, scattering, dusting or also by rubbing, powdering, injection, infiltration, or soaking of plants or plant parts, such as tubers cuttings, bulbs or seeds.

The fluorene carboxylic acid derivatives are advantageously formulated as emulsion concentrates with a content of 5 to 95, preferably 50 percent by weight, of active material. Wettable powders or granulates are likewise suitable.

The application rate for use in fields ranges between 0.1 and 50 kg./ha. For all other purposes, application concentrations of from 0.01 to 10,000 p.p.m. are suitable. For weed control in cereals, application rates of 0.1 to 5.0 kg./ha. have been found to be most suitable whereas for general growth retardation rates of about 1.0 to 10.0 kg./ha. are preferred.

In order to illustrate the extremely broad spectrum of useful applications of the compounds of the invention, the following special uses are explained in more detail.

Growth retardation in living plants is of outstanding importance. Because of the extremely low phytotoxicity of the compounds of the invention, any living plant may be temporarily retarded in its growth. After appropriate treatment, the plants return to normal growth. The application is most important for all cases where remaining vegetation is desired while new growth is undesired at least for a certain period. Any single or mixed vegetation may be treated, such as annuals and perennials, monocots and dicots, herbaceous plants, trees and brushes. From an economic standpoint, saving of cutting labor is most important. The application rate may be varied to range from 1 to 10 kg./ha. of the active compound.

Dwarfing of plants is highly important especially in those cases where the continued existence of the plants in reduced form is desired. Thus, in fields of cereals and also in other cultures a remaining "carpet" of dwarfed weeds has many advantages over a "naked" soil. Another important field of application includes all perennial cultures growing on slopes since dwarfed weeds protect against erosion by heavy rains without being competitive with respect to the culture plants.

Furthermore, dwarfing is important wherever changes in the habitus of living plants are desired in this respect. Thus, more bushy plants with reduced length of vegetative shoots can be seeded or planted, respectively, more densely so that the yield of plants per hectare is increased. Such application is of importance, for instance, for beans, e.g. soy beans, and cotton, and in general for all annual crops.

Dwarfing can even influence the metabolism of the plant; for instance, by the smaller leaf surface of a dwarfed plant the water evaporation and the transpiration rate of such a plant is reduced thus increasing its drought resistance. This is important in semi-arid climates. Even in ornamental flowers, dwarfing is of importance, especially for those growing in the greenhouse such as chrysanthemum, poinsettia, azalea, and bulbs. Dwarfing of brushes and trees in the nursery is another field of application. Application rates usually range from about 0.2 to 10 kg./ha. or 50 to about 500 p.p.m., respectively, in non-field applications.

Suppressing of the apical dominance in plants results in increased branching. Terminal growth is retarded while growth of the lateral buds is stimulated. This can be highly advantageous in cereals, soy beans, rice, sugar cane and forage crops such as lucerne. Improvement in tillering often is desirable since it can lead to increased yields (soy beans, small grains, rice, sugar cane). In addition, increased tillering can even enforce the capacity of the crop plants to compete with the weeds. In ornamentals, effecting an increase of the number of flowers is also of advantage.

The increased branching in addition is favorable for obtaining more side shoots for vegetative propagation, such as cuttings, creepers, layers, or tuber bearing stolones. Important fields of application are, for example, vine and strawberries. Concentrations to be applied vary between 0.1 and 10 kg./ha. or 10 to about 500 p.p.m., respectively.

Delaying of flowering which includes also delay of spring bud opening is especially useful in orchards and vineyards in order to avoid frost damage. Often treatment is made in the preceding autumn. Concentrations applied range from 10 to 10,000 p.p.m. of the active compounds, the water amount varying with local conditions from about 200 to 1000 l./ha.

Delay of ripening is of importance when harvest time is to be shifted. Of special interest in this connection are, for example, vegetables, beets and ornamental plants, particularly their bulbs. Doses applied usually are between 1 and 1000 p.p.m. of the active ingredient.

Delaying or even inhibition of sprouting is most important for instance for lettuce, potatoes and beets. Storability of vegetables, ornamental plants and fruits is improved. Application may be done either prior to harvest in the field or during storage in concentrations ranging from 10 to 10,000 p.p.m. of the active compounds, the rate of application being equivalent to about that of the preceding paragraph.

Delaying of leaf fall may be effected when a prolonged ripening time is desired or for aesthetic reasons in ornamental plants. Fields of application are, for instance, fruit trees, ornamental trees, and hedges. Concentrations used range between 10 and 10,000 p.p.m.

Increased flower and fruit formation is of importance especially in view of increased yields, for example in fruit growing including trees and berries, for example cherries and strawberries, as well as vegetables, particularly leguminoses such as beans. Preferred doses applied range from 1 to 1000 p.p.m. or 1 to 1000 g./ha., respectively.

Formation of parthenocarpic fruit has particularly been studied in potatoes, grapes, and pears. It is of special importance under conditions unfavorable for pollination or where flower fertility has suffered from frost or drought so that without treatment no fruit formation can be expected. Application of from 0.1 to 100 p.p.m. are suitable for inducing parthenocarpic fruit formation in such cases.

Increased vegetative propagation includes improvements in plant regeneration such as callus formation, increased formation of adventitious roots, and leaf bud initiation. Such processes are often accelerated and are of particular importance in any vegetative plant propagation via cuttings, layers, bud planting, and grafting. Concentrations between 1 and 1000 p.p.m. may be applied, for instance, to fruit trees, vines, ornamentals, and hevea.

In grafting, stimulation of forming adventitious roots in the hypobiont may be effected simultaneously with retardation of bud sprouting in the epibiont.

Even temporarily limited shifting of the ratio of shoot/root formation has been observed. The favored formation of roots reduces the water need of plants which is of advantage for young, pre-cultured plantlets which are treated just before or directly after trans-planting and thus may better support unfavorable conditions such as low rainfall.

Retardation of chlorophyll break-down is of importance for delaying post-harvest decay which results in prolonged marketing and life time of crop products. Pre- or post-harvest application is effected with concentrations from 1 to 1000 p.p.m. Plants to be treated are vegetables, for example carrots, radish, lettuce, and cut flowers.

Thinning of fruit is effected before all in fruit trees. A constant average number of fruits is preferred instead of a lot of fruits one year and low yields the following one. Applications dosages range from 0.1 to 1000 p.p.m. Fruit trees such as apple, plums, peaches, pears and cherries are preferred species.

Inhibition of side shoot growth is useful in many areas. First of all, saving of cutting labor is to be mentioned where trees, brushes, hedges and the like are treated, especially those along public roads or near electric or telegraph lines. Another important field of application is a denser fruit set in fruit trees which makes harvesting easier, for example for apples, pears, peaches, cherries, and citrus fruits. Furthermore, inhibition of unwanted side shoot growth, creeper or stolon growth is important in "chemical pruning," for example in tobacco (suppression of sucker formation), tomato, strawberries, and the like. Concentrations applied vary between 5 and 5000 p.p.m.

In meadows, suppression of herbal plants is often desired in order to favor growth of grasses which are more valuable as fodder. This process slowly reduces the herbs and thus ameliorates the quality of the fodder without diminishing the yield as was the case heretofore when using herbicides for this purpose. In addition, a total elimination of the herbs as effected by herbicides is not desired but rather a shifting of the composition of the plants in the meadow in favor of the grasses. Application rates vary from about 0.1 to 3 kg./ha. of the active compounds.

In addition, the active compounds may also be used to cultivate lawns. Weed growth is substantially completely suppressed while growth of grass can simultaneously be retarded. Thus, a better lawn may be produced while less mowing is necessary. This can be attained by applying from about 0.5 to 5 kg./ha. of at least one compound of Formula I.

For special applications, the following dosages can be used:

About 0.25 to 1.25 kg./ha. for elimination of broad-leafed weeds in lawns without retardation of the perennial grasses;

About 0.5 to 2.5 kg./ha. for elimination of broad-leafed weeds and annual weedy grasses, combined with short-time retardation of the perennial lawn grasses;

About 1.0 to 5.0 kg./ha. for elimination of broad-leafed weeds and annual weedy grasses combined with lasting retardation of the perennial lawn grasses, for example for about one month or even longer.

Of course, these application rates largely depend on the lawns to be treated, on the time they are applied, on the climate, and many other factors.

In the following examples, the active compounds are designated as follows:

1 = methyl-2-chloro-9-hydroxy-fluorene-9-carboxylate
2 = ethyl-2-chloro-9-hydroxy-fluorene-9-carboxylate
3 = n-butyl-2-chloro-9-hydroxy-fluorene-9-carboxylate
4 = isobutyl-2-chloro-9-hydroxy-fluorene-9-carboxylate
5 = n-butyl-2-bromo-9-hydroxy-fluorene-9-carboxylate
6 = methyl-2-iodo-9-hydroxy-fluorene-9-carboxylate
7 = methyl-2-fluoro-9-hydroxy-fluorene-9-carboxylate
8 = methyl-2-chloro-fluorene-9-carboxylate
9 = isopropyl-2-chloro-fluorene-9-carboxylate
10 = methyl-2,7-dichloro-9-hydroxy-fluorene-9-carboxylate
11 = methyl-2,7-dibromo-9-hydroxy-fluorene-9-carboxylate
12 = n-butyl-2,7-dichloro-9-hydroxy-fluorene-9-carboxylate
13 = n-butyl-2,7-dibromo-9-hydroxy-fluorene-9-carboxylate
14 = iso-octyl-2,7-dichloro-9-hydroxy-fluorene-9-carboxylate
15 = n-propyl-2,7-dichloro-9-hydroxy-fluorene-9-carboxylate
16 = sec.butyl-2,7-dichloro-9-hydroxy-fluorene-9-carboxylate
17 = n-propyl-2-chloro-9-hydroxy-fluorene-9-carboxylate
18 = i-propyl-2-chloro-9-hydroxy-fluorene-9-carboxylate
19 = n-heptyl-2-chloro-9-hydroxy-fluorene-9-carboxylate
20 = iso-octyl-2-chloro-9-hydroxy-fluorene-9-carboxylate
21 = methyl-2,7,9-trichloro-fluorene-9-carboxylate
22 = methyl-2,9-dichloro-fluorene-9-carboxylate.

EXAMPLE 1

Growth inhibition

Seed plants of bush beans, pumpkins, hemp nettles and French weed were grown in 8 cm. pots up to the beginning of the formation of the first true leaf or to the 2- or 3-leaf stage, respectively. Each pot received 25 ml. of an aqueous suspension of the active material, were pre-dissolved in acetone and suspended in a ratio by weight of 1:2 in de-mineralized water with addition of the commercial emulsifier "Tween 20." Application to the surface of the soil while avoiding wetting the plants.

Growth inhibition (H), leaf deformation of the new-growth (D) and axial shoot (A) were evaluated after 3 and 6 weeks. Evaluation scale 0 to 3 (0 = without effect, 3 = very strong). Compounds 1, 2, 3, 4, 5, 6 and 7 were tested. Table I contains the evaluation for compound 2. The values for the other compounds are not substantially different.

TABLE I

| Plants | Conc., p.p.m. | After 3 weeks | | | After 6 weeks | | |
|---|---|---|---|---|---|---|---|
| | | H | D | A | H | D | A |
| Bush beans | 100 | 3 | 2 | 2 | 3 | 3 | 3 |
| Pumpkins | 100 | 1 | 2 | 2 | 1-2 | 3 | 3 |
| French weed | 50 | 2 | 2 | 2 | 2-3 | 3 | 2-3 |
| Hemp nettle | 50 | 1 | 2 | 1 | 2 | 3 | 3 |
| Controls | | 0 | 0 | 0 | 0 | 0 | 0 |

The test shows the take up of the active compounds via the roots from the soil and their transport upwards to the points of tissue formation. It also shows the typical, slowly increasing action.

EXAMPLE 2

Growth inhibition

Young plants of hemp nettle and cleavers in the 3 node stage (cotyledon node excepted) received the active materials on the leaf surfaces of the fully developed leaves on the second node.

For hemp nettle, 0.04 ml. per plant were applied (0.02 ml. per leaf), in the case of cleavers 0.05 ml. (0.01 ml. per leaf). Compounds 1, 2 and 7 were tested. For formulation, they were pre-dissolved in acetone and suspended in a ratio by weight of 1:2 in demineralized water with addition of the commercial emulsifier "Tween 20."

The growth regulating effects observed above and below the strongly localized points of application are proof of the acropetal and basipetal transport of the active materials. Evaluation of the growth-regulating activity was made after 3 weeks according to Example 1.

TABLE II

| Compound | Conc., p.p.m. | Hemp nettle, 2d node | | | | | | Cleavers, 2d node | | | | | |
|---|---|---|---|---|---|---|---|---|---|---|---|---|---|
| | | Above | | | Below | | | Above | | | Below | | |
| | | D | H | A | D | H | A | D | H | A | D | H | A |
| 2 | 50 | 3 | 3 | 0 | 2 | 0 | 2 | 3 | 2 | 2 | 2 | 1 | 3 |
| 7 | 50 | 3 | 3 | 0 | 2-3 | 0 | 2-3 | 3 | 2-3 | 2-3 | 3 | 1 | 3 |
| 1 | 50 | 3 | 3 | 0 | 3 | 0 | 3 | 3 | 2-3 | 3 | 3 | 1 | 3 |
| Control | | 0 | 0 | 0 | 0 | 0 | 0 | 0 | 0 | 0 | 0 | 0 | 1 |

Similar effects were obtained with compounds 4, 5, 8, and 9.

EXAMPLE 3

Weed suppression and grass retardation in lawns and meadows

A cut lawn, species of grass being *Agrostis tenuis*, *Agrostis vulgaris*, *Festuca rubra*, *Festuca ovina*, *Lolium perenne* and *Poa pratensis*, intensively overgrown with weeds such as *Taraxacum officinale*, *Leontodon autumnalis* and *Plantago lanceolata* was sprayed with 1.0 or 2.0 kg., respectively, of compound 1 in 1000 l. water per hectare. First evaluation 6 weeks after treatment:

TABLE III

| Plants | Untreated | Treated | |
|---|---|---|---|
| | | 1.0 kg./ha. | 2.0 kg./ha. |
| Grasses | 30 to 40 cm. high, normally green, partially flowering or yielding seeds. | 8 to 10 cm. high | 4 to 6 cm. high, temporarily slightly yellow, no flowering, no seeds. |
| Weeds | Flowering or yielding fruits | | Very strongly inhibited, deformed and without inflorescences. |

The area was cut six weeks after treatment. A second evaluation two weeks after cutting gave the following results:

TABLE IV

| Plants | Untreated | Treated | |
|---|---|---|---|
| | | 1.0 kg./ha. | 2.0 kg./ha. |
| Grasses | 10 cm. high, normally green, new inflorescences sprouting. | 8 cm. high, normally green. | 6 to 8 cm. high, normally green. |
| Weeds | Normal, new inflorescences sprouting. | No new development, partially overgrown by grasses, fading. | Nearly completely supplanted by grasses, faded; area practically free of weeds. |

The experiment shows that development of grasses can be retarded lastingly according to the invention so that cutting labor may be saved; simultaneously, weeds are supplanted or eliminated. It is likewise an example for an alteration of the composition of species in a given plant population.

Tests with active materials 4 and 9 showed similar results although somewhat weaker in effect whereas compound 6 was about equal in effectiveness.

EXAMPLE 4

Growth inhibition

Sandy soil field plots, with the seeds of ground ivy (*Glechoma hederacea*), chickweed (*Stellaria media*), French weed (*Galinsoga parviflora*), stinging nettle (*Urtica urens*) and charlock (*Sinapsis arvensis*) were sprayed with compounds 1 and 5 in amounts of 1 and 2.5 kg. active material per hectare in 600 litres of water. Formulations were 50% emulsion concentrates prepared with "Shellsol A," petroleum and a common emulsifier. After 4 weeks, the infestation with weeds in comparison with the untreated control areas (A=germination in percent of control) as well as the condition of the developed plants (H=growth inhibition; D=deformation), was determined according to the evaluation 0=no effect to 3=very strong.

The test proves the suitability of the active materials according to the invention for the suppression and inhibition of plant growth by pre-germination application.

TABLE V

| 50% preparation | Doasge, kg./ha. | Glechoma | | | Stellaria | | | Galinsoga | | | Urtica | | | Sinapsis | | |
|---|---|---|---|---|---|---|---|---|---|---|---|---|---|---|---|---|
| | | A | H | D | A | H | D | A | H | D | A | H | D | A | H | D |
| 1 | 1 | 100 | 3 | 3 | 100 | 2 | 3 | 100 | 3 | 3 | 100 | 0 | 0 | 100 | 2 | 3 |
| | 2.5 | 25 | 3 | 3 | 15 | 3 | 3 | 25 | 3 | 3 | 50 | 3 | 3 | 100 | 3 | 3 |
| 5 | 1 | 100 | 2–3 | 2 | 100 | 3 | 3 | 100 | 3 | 3 | 100 | 2 | 2 | 100 | 2 | 3 |
| | 2.5 | 25 | 2–3 | 3 | 0 | | | 25 | 3 | 3 | 10 | 3 | 3 | 25 | 3 | 3 |
| Control | | 100 | 0 | 0 | 100 | 0 | 0 | 100 | 0 | 0 | 100 | 0 | 0 | 100 | 0 | 0 |

EXAMPLE 5

Growth inhibition

Open areas with strong infestation of hemp nettle (*Galeopsis spec.*), creeping knot grass (*Polygonum convolvulus*) and cleavers (*Galium aparine*) were sprayed with agents according to the invention. Up to the time of treatment, the weeds had developed 3–5 subsequent leaves (pre-flowering stage). Compounds 4 and 9 were tested. The 50% preparations formulated according to Example 4 were applied in amounts of 2.5 and 5 litres/hectare in 600 litres of water. 4 weeks after treatment, the state of plants was determined, characterized by growth inhibition deformations (especially of the leaves) and increase of side bud formation. From these characteristics, a summarized and averaged value is obtained scaled from 0=no effect to 3=very strong.

TABLE VI

| Preparation | Dosage, kg./ha. | Galium | Galeopsis | Polygonum |
|---|---|---|---|---|
| 4 | 2.5 | 2–3 | 2–3 | 2 |
| | 5 | 3 | 2–3 | 2 |
| 9 | 2.5 | 2–3 | 2–3 | 2 |
| | 5 | 3 | 3 | 2–3 |

Table VI proves the strong growth inhibition displayed by the active materials according to the invention. Even weeds usually difficult to control with known agents (Galium, Galeopsis, Polygonum) are very well attacked. Even stronger effects were obtained with active compounds 1, 2, 3, and 6.

EXAMPLE 6

Delay in flowering, ripening and leaf fall

Bush beans ("Saxa") in open land were sprayed with active materials in the early pre-flowering and in the early flowering stage. Compounds 10 and 11 were tested as 50% emulsion concentrates, formulated according to Example 4, and sprayed out with about 600 litres/hectare.

In the case of spraying in the pre-flowering stage, the dates of begin and end of flowering were determined. Decisive were 3–5 flowers per plant already or still present (average value of 20 plants). In the case of spraying in the early flowering stage, the beans were evaluated at two different times with regard to their developmental condition in that the total amount of fruit was divided into three classes of ripeness: 1=very young fruit (up to 3 cm. long), 2=average sized fruit (smooth), 3=ripening fruit (seeds become apparent). Counting of 20 plants per determination. Furthermore, the time was determined at which the defoliation towards the end of the vegetation period had reached about 50%.

TABLE VII (a) Flowering delay

| Compound | Conc. percent | Delay in begin of flowering (days) | Delay in end of flowering (days) |
|---|---|---|---|
| 10 | 0.05 | 5 | 5. |
| | 0.1 | 11 | 7. |
| | 0.2 | 16 | 13. |
| 11 | 0.05 | 6 | 7. |
| | 0.1 | 17 | 17. |
| | 0.2 | 21 | 21. |
| Control | | Begin of flowering after 23 days. | End of flowering after 48 days. |

(b) Ripening and defoliation delay

| Compound | Conc., percent | Classes of ripeness (Percent of total fruit quantity) | | | | | | Delay of defoliation (days) |
|---|---|---|---|---|---|---|---|---|
| | | After 4 weeks | | | After 6 weeks | | | |
| | | 1 | 2 | 3 | 1 | 2 | 3 | |
| 10 | 0.025 | 74 | 28 | 2 | 28 | 47 | 33 | 8 |
| | 0.05 | 78 | 24 | 0 | 35 | 49 | 21 | 12 |
| | 0.1 | 96 | 10 | 0 | 46 | 50 | 9 | 20 |
| Control | | 60 | 30 | 10 | 12 | 37 | 51 | 0 |

The tables show the strong growth-regulating action. The plants in addition become intensively green coloured. Even stronger effects have been obtained by applying compounds 1, 3, and 8.

EXAMPLE 7

Influence on flower and fruit sets and on stem branching

Bush beans of the "Saxa" variety in primary leaf stage were sprayed with the preparations of the active materials and kept in a greenhouse at temperatures of about 20° C. Compound 9 was tested which was suspended in demineralized water with the emulsifier "Tween 20" in the ratio 1:1 with an addition of 0.02% wetting agent.

The determination of the plants for branching (side shoot formation) or flower and fruit formation was on the first three shoot nodes. Evaluation 4 and 6 weeks after treatment. Table VIII demonstrates the sum of the branchings and of the flowers and fruit sets per leaf node, in comparison with the controls.

TABLE VIII

| Compound | Conc., p.p.m. | Number of— | |
|---|---|---|---|
| | | Branchings | Flowers and fruit sets |
| 9 | 0.01 | 3 | 2 |
| | 0.025 | 3.5 | 2.5 |
| | 0.05 | 5 | 3.5 |
| Control | | 0 | 1 |

EXAMPLE 8

Parthenocarpic fruits on tomatoes

Flower buds of tomato plants ("Lukullus"), before the opening of the corolla, were emasculated by removal of the stamens and styles. On the following day, each of the flowers thus prepared received one 0.02 ml. droplet of a preparation of the invention to the sepal crown. The active compounds were pre-dissolved in ethanol and mixed into a non-toxic lanolin-paraffin mixture (2:3) of appropriate viscosity. The flowers treated were evaluated for parthenocarpic fruit development 3 weeks after treatment.

TABLE IX

| Conc. (percent) | Percent of treated flowers with fruit sets | |
|---|---|---|
| | 0.005 | 0.01 |
| Active compound: | | |
| 4 | 35 | 45. |
| Controls | No fruit development | Flowers dropped off. |

EXAMPLE 9

Branching of ball cacti/increased vegetative propagation

Pin-cushion cacti of a clone (Echinocactus spec., diam. about 3-4 cm.) received, per plant, by injection into the shoot parenchyma, 0.5 ml. of an aqueous suspension each of compounds 4, 9, 10, and 11 in concentrations of 50 and 500 p.p.m., respectively in demineralized water (3 plants per treatment).

The treated plants developed within 3-6 weeks between 6 and 20 visible side shoots per plant, whereas the untreated controls remained unbranched. Thus, vegetative propagation by side shoot formation is intensified. The higher concentrations increased the number of side shoots but inhibited simultaneously normal growth for some weeks.

With compounds 13, 14, 15 and 16 similar effects could be obtained.

EXAMPLE 10

Growth inhibition/dwarfing

Soybean plants (Glyzine max.) in an early state of growth were treated with solutions of the active materials (12.5% emulsifiable concentrate) in concentrations as indicated in Table X. 4 weeks after treatment, the relative height (in percent of the controls) and the number of pods per plant were evaluated.

TABLE X

| Compound | Concentration, percent | Relative height | Pods plant |
|---|---|---|---|
| 9 | 0.625 | 33 | 29 |
| | 0.2 | 60 | 38 |
| | 0.08 | 70 | 36 |
| 2 | 0.625 | 31 | 20 |
| | 0.2 | 33 | 30 |
| | 0.08 | 47 | 30 |
| Control | | 100 (1.12 m.) | 28 |

Table X shows that vegetative plant development with respect to height may be controlled within large ranges without considerable leaf deformations in the plants ("tailor-made" inhibition of vegetative growth). In the moderate dwarfing of this experiment down to ½ to ⅓ of the normal height, no decrease of the number of pods was observed. This possibly allows a better use of the crop area and by narrower planting higher crop yields per area.

EXAMPLE 11

Inhibition of sprouting

Potato plants in the field were sprayed at about flowering time (6 weeks before harvest). Active compound 1 was applied in concentrations of 10, 50 and 100 p.p.m. In this progressed stage of development, no remarkable leaf deformations occurred and the active materials were transported with the assimilates down to the developing tubers. After harvest, samples of tubers were stored in small bags and then, during February to June, they were laid in a greenhouse for sprouting at temperatures of 20-25° C. while being covered with a dark foil.

Control tubers sprouted normally, whereas the treated potatoes showed a strong effect on the development of the dark sprouts which were strongly inhibited immediately after begin of bud burst so that only broad, deformed and short dark sprouts were formed.

Final evaluation in June: Untreated potatoes shrivelled and flabby, with dark sprouts of 6-15 cm. Potatoes obtained from treated plants still stable and nearly unchanged with deformed short sprouts of only 1-2 cm.

EXAMPLE 12

Control of weed growth

A freshly treated soil—loamy sand—was sprayed with 16, 24, and 48 l./ha. of an emulsion concentrate (12.5%) of active compound 1. The water used amounted to 1000 l./ha. Two months after treatment, the control areas were covered with a dense stand of Galinsoga, Cirsium, Urtica and Echinochloa.

The treated areas showed the following stand:

48 l=6 kg./ha.: no Galinsoga, Cirsium rare, stopped in small rosette; Urtica and Echinochloa rare, dwarfed, more branched and darker green.

24 l=3 kg./ha.: Galinsoga and Cirsium a little bit less inhibited, but practically eliminated; Urtica and Echinochloa some more plants, less inhibited, more branched and darker green.

16 l.=2 kg./ha.: Galinsoga rare, totally dwarfed; Cirsium stopped at 10-15 cm. of height; Urtica and Echinochloa scarcely inhibited, but more branched and darker green than controls.

The experiment shows that treatment of the soil gives a more pronounced selectivity than foliar treatment. A strong and long lasting effect in light soil and an enduring alteration of the growth habits of the more resistant plants without essential leaf deformations is clearly demonstrated.

Nearly the same results were obtained with compounds 2 and 7 whereas somewhat higher concentrations were necessary for compounds 3, 4, 5, 8 and 9.

EXAMPLE 13

Dwarfing of weeds

Test areas with maize (Zea mays) were sprayed with 8 and 12 l., respectively, of a 12.5% emulsion concentrate of active compound 1, corresponding to an application rate of 1.0 and 1.5 kg./ha., respectively, in 500 l. water/ha. Application took place when the maize and the weeds were in the 3-4 leaf stage. Evaluation 6 weeks after treatment; maize no alterations; no remakable growth inhibition or deformation; weeds (Galinsoga, Urtica, Solanum and Echinochloa) severely dwarfed, forming a soil-protecting plant carpet, of only 5-8 cm. in height which is in no way competittive to the crop.

In the control area, the weeds overgrew the maize. Comparable effects were obtained with compounds, 8, 9, 21 and 22 in appropriate concentrations.

EXAMPLE 14

Increased branching

Plants of *Vicia faba* were sprayed during the 4-5 leaf stage at a height of about 15 cm. with 2, 4, and 6 l. of a 12.5% emulsion concentrate of active compound 2 in 500 l. water/ha.

6 days after treatment: torsions of the stems.

14 days after treatment: plants are straight upright and 2-3 basic side branches begin to emerge.

6 weeks after treatment: plants flowering, of about same height as controls but with 3—4 almost equally growing stems whereas the control plants do not show but the normal 1-2 stems.

The experiment shows the promotion of branching without lasting inhibition of new-growth, leaf formation, flowering, and photosynthesis. More stems per area may lead to higher yields.

EXAMPLE 15

Inhibition of bolting

Celery plants which passed the winter in cool and thus were ready to blossom were sprayed directly before begin of bolting with a 12.5% emulsion concentrate of compound 1 (diluted to 0.4%=500 p.p.m. active ingredient). 4 weeks after treatment, inhibition of bolting was determined by evaluating failure of stem elongation and formation of flowers.

Result: controls bolted and flowering, 100%. Treated plants no bolting (100%), tubers preserved. Even with lower concentrations bolting could be avoided.

For comparison: no inhibition of bolting by application

|  | P.p.m. |
|---|---|
| Sodium triiodobenzoate | 2000 |
| Chlorocholine chloride | 5000 |
| 2-methoxy-3,6-dichloro-benzoic acid | 5000 |
| Dimethyl-succinic acid mono-hydrazide | 500 |

Similar results were obtained with even lower concentrations of compounds 2 and 6 on lettuce (*Lactua sativa* var. *capitata*).

EXAMPLE 16

Growth retardation

Chrysanthemum plants were sprayed with active compound 1 in concentrations of 250, 500, 1000 and 2000 p.p.m. corresponding to application rates of 1, 2 and 4 kg./ha., respectively.

Application as foliar spray and as soil drench. The height of the plants and alterations were evaluated 21 days after treatment.

Inhibition of stem elongation H was determined according to $$H = \frac{\text{final height} = \text{initial height}}{\text{initial height}} \times 100$$

Alterations were determined as follows:

0=no effect
1=slight effect
2=moderate effect
3=strong effect
4=death of plant

Table XI gives the results:

TABLE XI

| Mode of application | Conc. | H | Alterations |
|---|---|---|---|
| Foliar spray | ¹ 250 | 29 | 1 |
|  | ¹ 500 | 41 | 1 |
|  | ¹ 1,000 | 29 | 1 |
|  | ¹ 2,000 | 34 | 2 |
| Soil drench | ² 1 | 32 | 0 |
|  | ² 2 | 23 | 0 |
|  | ² 4 | 51 | 0 |
| Control |  |  |  |

¹ P.p.m.  ² Kg./ha.

Soil treatment in addition yielded an extreme dark coloring of the plants.

EXAMPLE 17

Promotion of branching

The foliage of three months' young seedlings of orange (Sweet Orange) was sprayed with an aqueous solution of active compound 19 in the concentrations given below. 6 weeks after treatment, growth and branching were evaluated.

TABLE XII

|  | Treated |  | Controls |
|---|---|---|---|
| Concentration (p.p.m.) | 100 | 1,000 |  |
| Height (mm.) | 105 | 85 | 147 |
| Average length of new-grown sprouts (mm.) | 4.0 | 2.8 | 13.5 |
| Average number of side sprouts per plant | 3.1 | 3.0 | 0 |

Thus, promotion of branching due to the break-down of apical dominance is clearly demonstrated.

Corresponding results were obtained with compounds 17, 18, and 20.

EXAMPLE 18

Retardation of chlorophyll break-down

Parts from leafs of Rumex obtusi folius were floated for 24 hours on an aqueous solution of active compound 2 and then spread on humid filters in the dark. After 4 days, the content of the leaf parts in chlorophyll $(a+b)$ was determined photometrically. The values given in Table XIII are average values of each 20 measurements.

TABLE XIII

| Active compound | Conc., p.p.m. | Chlorophyll content |
|---|---|---|
| 12 | 0.01 | 102 |
|  | 0.1 | 160 |
|  | 1.0 | 206 |
|  | 10.0 | 158 |
| Controls | Water | 100 |

With 10 p.p.m., slight damages of the tissue were observed on the brims which were somewhat less when using compounds 18 or 20 with otherwise corresponding results.

EXAMPLE 19

Vegetative propagation

Capability of regeneration such as callus formation, rooting of cuttings, or formation of adventitious buds are the basis for vegetative propagation of plants.

(a) formation of adventitious roots.—Sprouts of Coleus (C), Phaseolus (P) and Helianthus (H) are cut as cuttings and put with the defoliated stem basis for 12 hours in the various aqueous solutions containing the active ingredients. Subsequently, they are stuck into a bed of humid sand. After 4 weeks, regeneration of the adventitious roots is evaluated. The active compounds are pre-dissolved in acetone and the solution obtained is diluted with water to the desired concentration.

TABLE XIV

| Active compound | Conc., mol. | Roots C | P | H |
|---|---|---|---|---|
| 1 | $=10^{25}$ | 0 | -- | -- |
|  | $=10^{26}$ | + | ++ | ++ |
|  | $=10^{27}$ | ++ | ++ | ++ |
|  | $=10^{28}$ | +++ | ++ | ++ |
| Controls |  | 0 | 0 | ? |

NOTE.—0=no effect; +, ++, +++=low, moderate, strong promotion; -, --, ---=low, moderate, strong inhibition.

(b) formation of callus.—Vine cuttings were treated for 24 hours with an aqueous solution of the active compound (pre-dissolved in acetone) and then grafted onto the preprepared supports. 4 weeks after treatment, formation of callus (callus tissue in grams per graft) as criterion for the intergrowth and formation of adventitious roots was evaluated.

8 weeks later, the final success was determined in percent of the grown grafts. All values are averaged.

TABLE XV

| Active compound | Conc., mol. | Callus (g.) | Roots | Success, percent |
|---|---|---|---|---|
| 1 | $10^{-7}$ | 5.0 | Good | 84 |
| Controls | 0 | 1.2 | Poor to moderate | 68 |

(c) formation of leaf buds.—Leafs parts of Begonia rex were floated for 24 hours on a nutritive solution containing the active ingredient. Subsequently, they were cultivated on humid filters.

The number of leaf buds per leaf part (averaged) were determined after 40 and 100 days.

TABLE XVI

| Active compound | Conc., p.p.m. | Leaf buds after— | |
|---|---|---|---|
| | | 40 days | 100 days |
| _____ | 0.1 | 10 | 12 |
| | 1.0 | 18 | 20 |
| | 10.0 | 13 | 25 |
| | 100.0 | 12 | 37 |
| Controls_____ | Water | 5 | 7 |

Growth inhibition of tobacco suckers

The sprouting of "suckers" in tobacco after removal of apical stem parts is highly undesired.

The active compounds were applied as foliar spray (aqueous suspension containing common emulsifier) prior to removal of terminal flowers to tobacco plants in the 8–10 leaf stage. Four hours after treatment, the apical meristems were removed. 21 days after treatment, observations on growth of axillary shoots (suckers) were made. The average weight of the suckers was determined (in g.) by the total weight of suckers per plant divided by the number of suckers per plant.

TABLE XVII

| Active compound | Conc. p.p.m. | Sucker wt., g. |
|---|---|---|
| 1_____ | 60 | 2.5 |
| | 120 | 1.8 |
| | 240 | 1.0 |
| 5_____ | 60 | 1.3 |
| | 120 | 1.6 |
| | 240 | 1.5 |
| Controls_____ | | 3.4 |

Both active compounds thus show a significant reduction in growth of suckers. With the highest concentrations (240 and partially also 120 p.p.m.), however, some injury to tobacco leaves was noted.

EXAMPLE 21

Growth control

Spraying of grass test areas. Age of grasses about 8 months.

Combatting of weeds 4 weeks before experiment treatment, last cutting 5 days before.

Test compounds were 1 and 7.

Application rate 4 kg./ha. in about 500 l./ha. of water.

The various grass species given in Table XVIII were tested. The reduction in weight (fresh material) in percent of the controls (=100%) was determined 12 weeks after treatment.

TABLE XVIII

| | Percent | |
|---|---|---|
| Active compound | 1 | 1+10 [1] |
| Grass species: | | |
| Lolium perenne_____ | −53.4 | −47.0 |
| Festuca ovina_____ | −37.5 | −40.1 |
| Festuca pratensis_____ | −66.3 | −62.8 |
| Poa pratensis_____ | −46.0 | −42.0 |
| Agrostis stolonifera_____ | −53.0 | −54.2 |
| Agrostis tenuis_____ | −30.0 | −29.4 |
| Dactylis glomerata_____ | −50.8 | −47.5 |
| Bromus inermis_____ | −30.7 | −28.8 |
| Average_____ | −46.0 | −44.0 |

[1] Technical mixture obtained by chlorination of methyl-9-hydroxy-fluorene-9-carboxylate consisting of 1, 10, and some starting material, in a concentration of about 65 to 70% of methyl 2-chloro-9-hydroxy-fluorene-9-carboxylate, about 10 to 15 of methyl 2, 7-dichloro-9-hydroxy-fluorene-9-carboxylate, and about 15–20% methyl 9-hydroxy-fluorene-9-carboxylate.

EXAMPLE 22

Growth inhibition

Spraying of test areas with grasses and weeds.

(1) treatment: begin of vegetation, grass height 11 cm.

(2) treatment: begin of sprouting, grass height 16 cm.

Active compound 1, formulated 12.5% emulsion concentrate.

TABLE XIX

| | Dosage, l./ha. | Grass height, cm. | Grass height (cm.) after— | | |
|---|---|---|---|---|---|
| | | | 3 weeks | 6 weeks | 20 weeks |
| 1. Treatment_____ | 10 | 11 | 12 | 14 | 53 |
| | 20 | 11 | 12 | 14 | 53 |
| | 30 | 11 | 10 | 14 | 40 |
| Control_____ | | 11 | 16 | 27 | 58 |
| | | | 4 weeks | 8 weeks | 18 weeks |
| 2. Treatment_____ | 10 | 15 | 15 | 40 | 53 |
| | 20 | 15 | 14 | 30 | 43 |
| | 30 | 15 | 14 | 19 | 35 |
| Control_____ | | 15 | 27 | 53 | 58 |
| | | | 2 weeks | 8 weeks | 16 weeks |
| 3. Treatment_____ | 10 | 16 | 16 | 30 | 35 |
| | 20 | 16 | 18 | 40 | 43 |
| | 30 | 16 | 16 | 28 | 33 |
| Control_____ | | 16 | 27 | 65 | 65 |

Similar results were obtained with 12.5% emulsion concentrates of compounds 2, 7, and mixtures of 1 and 10.

EXAMPLE 23

Growth inhibition/retardation

Young seedlings of cleavers (*Galium aparine*) were planted in 8 cm. pots (3 per pot) and treated after 2 days in the early cotyledon stage with each 50 p.p.m. of compounds 10, 11, and 12. 14 days after treatment, the growth and development inhibition was evaluated in comparison with untreated controls, the evaluation scale ranging from 0=no effect through 1=weak, 2=strong, to 3=very strong effect.

The active materials were dissolved in small amounts of acetone and the solution obtained was suspended in demineralized water. Traces of the commercial emulsifier "Tween 20" were added.

3 tests each with 6 plants were carried out and the values obtained were averaged.

The figures in Table XX indicate the activity as compared to the controls.

TABLE XX

| Active compound | Activity |
|---|---|
| 10_____ | 3. |
| 11_____ | 3. |
| 12_____ | 2–3. |
| Controls_____ | Normal growth and development. |

EXAMPLE 24

Increase in flowering and fruiting 3 species of strawberry plants were treated in the 7 to 9 leaves state. Application took place in October whereas planting had been effected in the preceding August.

The yield of strawberries in the following summer was determined. Increase in flowering could be observed.

TABLE XXI

| Active compound | Kg./ha. | Senga, kg. | Sengana, percent of controls | Senga, kg. | Precosa, percent of controls | Senga, kg. | Gigana, percent control |
|---|---|---|---|---|---|---|---|
| Control_____ | | 2,670 | 100 | 560 | 100 | 2,340 | 100 |
| 1_____ | 0.003 | 3,770 | 141.0 | 665 | 118.7 | 2,750 | 117.0 |
| | 0.03 | 3,010 | 112.7 | 1,130 | 201.8 | 2,860 | 122.2 |
| | 0.3 | 3,110 | 116.4 | 695 | 124.0 | 3,095 | 132.3 |

Thus, extremely low application rates such as 3 to 300 g. active compound-ha resulted in considerable increase in yields.

EXAMPLE 25

Fruit thinning

On a single Jonathan apple tree, 36 branches were selected each bearing at least 20 floral clusters. Six of these branches were selected at random to serve as controls.

One week after full bloom, branches were sprayed with the active compounds at various concentrations ranging from 0.1 to 80 p.p.m. in 10% ethanol. Control branches were sprayed with 10% ethanol alone.

The tree was examined seven weeks later. In the highest concentrations with active ingredient 1, curvatures of leaves was observed. No leaf damage was observed with 10% ethanol alone. The table shows the number of fruits remaining 5 weeks after spraying.

| Active compound | Conc., p.p.m. | Fruits per cluster, percent |
|---|---|---|
| Control | | 70 |
| 1 | 1 | 65 |
|  | 3 | 58 |
|  | 5 | 44 |
|  | 10 | 20 |

With respect to formulations of the active compounds, the following examples are given for illustration. The parts given are parts by weight.

EXAMPLE I

| | Parts |
|---|---|
| Methyl-2-chloro - 9 - hydroxy - fluorene-9-carboxylate | 40 |
| Precipitated silicic acid | 10 |
| Sulfite powder | 15 |
| Alkylnaphthalene sulfonate | 0.5 |
| Bole | 34.5 |

EXAMPLE II

| | Parts |
|---|---|
| Ethyl-2-chloro-9-hydroxy - fluorene-9-carboxylate | 12.5 |
| Dimethylformamide | 12.5 |
| Benzene | 65 |
| Emulsifier (alkylarylsulfonate+polyoxyethylene-tall oil ester) | 10 |

EXAMPLE III

| | Parts |
|---|---|
| Methyl - 2,7 - dichloro-9-hydroxy-fluorene-9-carboxylate | 75 |
| Kaoline clay | 18 |
| Oleic acid N-methyltauride | 7 |

EXAMPLE IV

| | Parts |
|---|---|
| n - Butyl - 2 - bromo - 9 - hydroxy-fluoroene-9-carboxylate | 75 |
| Precipitated silicic acid | 5 |
| Sulfite powder | 10 |
| Alkylnaphthalene sulfonate | 0.5 |
| Bole | 9.5 |

EXAMPLE V

| | Parts |
|---|---|
| Iso - octyl - 2 - chloro-9-hydroxy-fluorene-9-carboxylate | 75 |
| Precipitated calcium silicate | 20 |
| Oleic acid N-methyltauride | 5 |

EXAMPLE VI

| | Parts |
|---|---|
| Methyl-2,7,9-trichloro-fluorene-9-carboxylate | 40 |
| Oleylalcohol polyglycolether | 3 |
| Carboxymethyl cellulose | 1 |
| Bentonite | 2 |
| Water | 54 |

Instead of methyl-2,7,9-trichloro-fluorene-9-carboxylate, methyl-2,9-dichloro-fluorene-9-carboxylate may be used as well.

EXAMPLE VII

| | Parts |
|---|---|
| Methyl-2-chloro-fluorene-9-carboxylate | 25 |
| Dimethylformamide | 5 |
| Benzene | 65 |
| Emulsifier (alkylarylsulfonate+polyoxyethylene tall oil ester) | 5 |

EXAMPLE VIII

| | Parts |
|---|---|
| Methyl-2-fluoro-9-hydroxy-fluorene-9-carboxylate | 75 |
| Sulfite powder | 15 |
| Alkylnaphthalene-sulfonate | 1 |
| Bole | 9 |

Instead of methyl-2-fluoro-9-hydroxy-fluorene-9-carboxylate, methyl-2-iodo-9-hydroxy-fluorene-9-carboxylate may be used as well.

EXAMPLE IX

| | Parts |
|---|---|
| Methyl-2,7-dibromo - 9 - hydroxy-fluorene-9-carboxylate | 42 |
| Solvent-naphtha | 25 |
| Xylene | 30 |
| Emulsifier (mixture of nonylphenol polyglycol ether and calcium dodecylbenzene-sulfonate) | 3 |

EXAMPLE X

| | Parts |
|---|---|
| 98% technical mixture containing from 65 to 70% methyl - 2 - chloro - 9-hydroxy-fluorene-9-carboxylate, 10 to 15% methyl-2,7-dichloro-9-hydroxy-fluorene-9-carboxylate, and about 15–20% methyl-9-hydroxy-fluorene-9-carboxylate | 40 |
| Silicic acid | 12 |
| Sulfite powder | 17 |
| Emulsifier (alkylarylsulfonate+nonylphenolpolyglycolether) | 0.5 |
| Bole | 30.5 |

EXAMPLE XI

| | Parts |
|---|---|
| 98% technical mixture containing from 65 to 70% methyl-2-chloro - 9 - hydroxy-fluorene-9-carboxylate, 10 to 15% methyl-2,7-dichloro-9-hydroxy-fluorene-9-carboxylate, and about 15–20% methyl-9-hydroxy-fluorene-9-carboxylate | 12.5 |
| Dimethylformamide | 12.5 |
| Benzene | 65 |
| Emulsifier (alkylarylsulfonate+polyoxyethylene tall oil ester) | 10 |

EXAMPLE XII

| | Parts |
|---|---|
| n-Butyl-2,7-dichloro-9-hydroxy - fluorene - 9 - carboxylate | 40 |
| Cyclohexanone | 10 |
| Benzene | 45 |
| Emulsifier (alkylarylsulfonate+nonylphenolpolyglycolether) | 5 |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition suitable for retarding plant growth, said composition containing
(a) an inert liquid or solid diluent; and (b) as an essential effective ingredient an effective amount of at least one compound of the formula

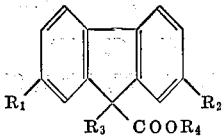

wherein $R_1$ is chlorine, bromine, fluorine or iodine, $R_2$ is chlorine, bromine, fluorine, iodine or hydrogen, $R_3$ is hydrogen, hydroxy or chlorine, $R_4$ is an alkyl group of up to 8 carbon atoms.

2. A composition according to claim 1 wherein in the effective compound $R_1$ and $R_2$ are chlorine.

3. A composition according to claim 1 wherein in the effective compound $R_1$ is chlorine and $R_2$ is hydrogen.

4. A composition according to claim 1 wherein the effective compound is a member of the group consisting of compounds of the formula

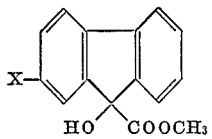

wherein X is chlorine or bromine.

5. A composition according to claim 1 wherein the effective compound is methyl-2-chloro-9-hydroxy-fluorene-9-carboxylate.

6. A composition according to claim 1 wherein the effective compound is methyl-2-bromo-9-hydroxy-fluorene-9-carboxylate.

7. A composition according to claim 1 wherein the effective compound is methyl-2-chloro-fluorene-9-carboxylate.

8. A composition according to claim 1 wherein the effective compound is butyl-2,7-dichloro-9-hydroxy-fluorene-9-carboxylate.

9. A composition according to claim 1 wherein the effective ingredient is a mixture comprising essentially methyl-2-chloro-9-hydroxy-fluorene-9-carboxylate, methyl-2,7-dichloro-9-hydroxy-fluorene-9-carboxylate, and methyl-9-hydroxy-fluorene-9-carboxylate.

10. A composition according to claim 1 containing as the effective ingredient a mixture (about 98%) comprising essentially of about 65 to 70% of methyl-2-chloro-9-hydroxy-fluorene-9-carboxylate, about 10 to 15% of methyl 2,7-dichloro-9-hydroxy-fluorene-9-carboxylate, and about 15–20% methyl-9-hydroxy-fluorene-9-carboxylate.

11. A composition according to claim 1 wherein the effective ingredient is present in an amount between 5 and 95 percent per weight.

12. A composition according to claim 1 wherein the effective ingredient is present in an amount of about 50 percent by weight.

13. A method of regulating plant growth which comprises applying to the locus to be treated at least 0.01 p.p.m., but less than phytotoxic amounts of at least one compound of the formula

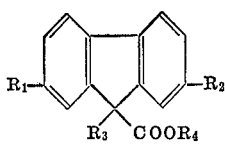

wherein
$R_1$ is chlorine, bromine, fluorine or iodine
$R_2$ is hydrogen, chlorine, bromine, fluorine, or iodine
$R_3$ is hydrogen, hydroxy or chlorine
$R_4$ is an alkyl group of up to 8 carbon atoms.

14. A method according to claim 13 which comprises applying the effective compound to the locus to be treated at a rate of 0.1 to 50 pounds per acre.

15. A method according to claim 13 which comprises applying the effective compound to the locus to be treated in a concentration ranging from 0.01 to 10,000 p.p.m.

16. A method as defined by claim 13 wherein said activity comprises effecting growth retardation in living plants.

17. A method as defined by claim 13 wherein said activity comprises effecting dwarfing of living plants.

18. A method as defined by claim 13 wherein said activity comprises effecting suppressing apical dominance, thereby effecting increased branching in living plants.

19. A method as defined by claim 13 wherein said activity comprises effecting delaying of flowering in living plants.

20. A method as defined in claim 13 wherein said activity comprises effecting delaying of ripening in plants.

21. A method as defined by claim 13 wherein said activity comprises effecting delaying of sprouting.

22. A method as defined by claim 13 wherein said activity comprises effecting delaying of leaf fall in living plants.

23. A method as defined by claim 13 wherein said activity comprises effecting increased flower and fruit formation in living plants.

24. A method as defined by claim 13 wherein said activity comprises effecting formation of parthenocarpic fruit.

25. A method as defined in claim 13 wherein said activity comprises effecting increased vegetative propagation.

26. A method as defined by claim 13 wherein said activity comprises effecting retardation of chlorophyll break-down.

27. A method as defined by claim 13 wherein said activity comprises effecting thinning of fruit in cultured plants.

28. A method as defined by claim 13 wherein said activity comprises effecting inhibition of side shoot growth.

29. A method as defined by claim 13 wherein said activity comprises effecting suppression of herbs thereby favoring growth of grasses in a meadow.

30. A process of establishing a lawn comprising applying 0.5 to 5 kg./ha. of at least one compound of Formula I as defined in clam 1 thereby suppressing substantially completely weed growth while simultaneously retarding growth of grass.

31. A process according to claim 30 which comprises applying methyl - 2 - chloro - 9 - hydroxy-fluorene-9-carboxylate.

32. A composition according to claim 1 wherein in the effective compound $R_1$ and $R_2$ are chlorine, and $R_3$ is hydroxy.

33. A composition according to claim 32 wherein $R_4$ is methyl.

34. A process according to claim 13 wherein $R_2$ is hydrogen.

35. A composition according to claim 1 containing pulverulent solids and a surface active agent.

36. A process as defined by claim 13 wherein $R_1$ and $R_2$ are chlorine.

37. A process as defined by claim 13 wherein $R_1$ is chlorine and $R_2$ is hydrogen.

38. A process as defined in claim 13 whrein $R_1$ is chlorine or bromine, $R_2$ is hydrogen, $R_3$ is hydroxyl, and $R_4$ is methyl.

(References on following page)

References Cited

UNITED STATES PATENTS 3,452,076  6/1969  Mohr et al. _____ 71—107X

OTHER REFERENCES

Journal of The Science of Food and Agriculture, vol. 5, p. 45 (1945).

Plant Regulators, CBCC Positive Data Series, No. 2, June 1955, pp. a, b, c, 1 and 31.

JAMES O. THOMAS, JR., Primary Examiner

U.S. Cl. X.R.

47—2; 71—68, 77, 78, 107, Dig-1; 99—154; 260—469, 473